(12) United States Patent
Huang et al.

(10) Patent No.: US 10,901,552 B2
(45) Date of Patent: Jan. 26, 2021

(54) SIGNAL PROCESSING CIRCUIT AND RELATED METHOD OF PROCESSING SENSING SIGNAL

(71) Applicant: NOVATEK Microelectronics Corp., Hsin-Chu (TW)

(72) Inventors: Min Huang, Taoyuan (TW); Chi-Ting Chen, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 70 days.

(21) Appl. No.: 16/243,105

(22) Filed: Jan. 9, 2019

(65) Prior Publication Data

US 2019/0212873 A1 Jul. 11, 2019

Related U.S. Application Data

(60) Provisional application No. 62/615,944, filed on Jan. 10, 2018.

(51) Int. Cl.
*G06F 3/041* (2006.01)
*G06K 9/00* (2006.01)
*G06F 3/044* (2006.01)

(52) U.S. Cl.
CPC .......... *G06F 3/0418* (2013.01); *G06F 3/044* (2013.01); *G06K 9/0002* (2013.01)

(58) Field of Classification Search
CPC ..... G06F 3/0418; G06F 3/044; G06K 9/0002; G01R 27/2605; H03F 3/45; H03F 3/70; H03M 1/12
USPC ........................................................ 345/174
See application file for complete search history.

(56) References Cited

U.S. PATENT DOCUMENTS

| 8,942,309 | B1 | 1/2015 | Ware |
| 2006/0284603 | A1 | 12/2006 | Nehrig |
| 2009/0032312 | A1 | 2/2009 | Huang |
| 2016/0344403 | A1 | 11/2016 | Sonnaillon |
| 2018/0052558 | A1* | 2/2018 | Wang ................... H03K 17/955 |
| 2018/0219476 | A1 | 8/2018 | Kain |

* cited by examiner

*Primary Examiner* — Mark Edwards
(74) *Attorney, Agent, or Firm* — Winston Hsu

(57) ABSTRACT

A signal processing circuit for receiving a sensing signal from a sensor includes a capacitor group, an amplifier and a switch. The sensing signal consists of a common-mode part and a differential-mode part. The capacitor group, coupled to a node, includes an input capacitor for coupling the sensing signal to the node and a compensation capacitor for coupling a compensation signal to the node. The amplifier, coupled to the node, is configured to amplify the sensing signal coupled from the input capacitor. The switch is coupled between the node and the amplifier.

29 Claims, 11 Drawing Sheets

Phase 3

Phase 4

SIGNAL PROCESSING CIRCUIT AND RELATED METHOD OF PROCESSING SENSING SIGNAL

CROSS REFERENCE TO RELATED APPLICATIONS

This application claims the benefit of U.S. Provisional Application No. 62/615,944, filed on Jan. 10, 2018, the contents of which are incorporated herein by reference.

BACKGROUND OF THE INVENTION

1. Field of the Invention

The present invention relates to a signal processing circuit and a related method of processing a sensing signal, and more particularly, to a signal processing circuit and a related method of processing a sensing signal for a fingerprint sensor.

2. Description of the Prior Art

With advancements in technology, mobile devices such as smart phones, tablets, laptops, GPS navigation systems and electronic books have become indispensable in our daily life. Compared with conventional mobile phones that only have communication functions, modern mobile devices combine various functions such as communication, networking, photographing, games and data processing. This type of multifunctional design is more attractive to consumers. Fingerprint recognition is a popular function for security and privacy in various electronic devices including mobile devices, and can be implemented in different techniques such as capacitive sensing, optical (image sensing), thermal, ultrasonic, etc. For example, a mobile phone may have a fingerprint recognition interface built into a home button or in a dedicated region to detect user fingerprint.

Among those fingerprint recognition techniques, the capacitive fingerprint recognition scheme has become a popular way for implementing fingerprint recognition. With capacitive fingerprint recognition, the sensing pixels in a fingerprint sensor may fetch the capacitance of a touch finger, where the capacitance is processed and converted into a voltage signal which is further forwarded to a follow-up circuit such as an analog front-end (AFE) circuit to be recognized. As for the fingerprint sensor, the voltage signals obtained from the pixels usually include a common-mode (CM) part and a differential-mode (DM) part, wherein the CM part is a useless signal. The useful signal that is actually required is the DM part, and thus the CM part of the pixel data signal should be removed. Without removing the CM part, the voltage signal being processed in the follow-up circuit may be saturated.

Thus, there is a need to provide a novel signal processing circuit to effectively eliminate the CM part, especially the large variation of the CM part generated with the variation of the touch transmitting signal.

SUMMARY OF THE INVENTION

It is therefore an objective of the present invention to provide a signal processing circuit and a related method of processing a sensing signal from a fingerprint sensor, to eliminate the variation of the common-mode part of the sensing signal.

An embodiment of the present invention discloses a signal processing circuit for receiving a sensing signal from a sensor. The sensing signal consists of a common-mode part and a differential-mode part. The signal processing circuit comprises a capacitor group, an amplifier and a switch. The capacitor group, coupled to a node, comprises an input capacitor for coupling the sensing signal to the node and a compensation capacitor for coupling a compensation signal to the node. The amplifier, coupled to the node, is configured to amplify the sensing signal coupled from the input capacitor. The switch is coupled between the node and the amplifier.

Another embodiment of the present invention discloses a method of processing a sensing signal received from a sensor. The sensing signal consists of a common-mode part and a differential-mode part. The method comprises the steps of: coupling the sensing signal to a node; coupling a compensation signal to the node; and amplifying the sensing signal coupled to the node.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
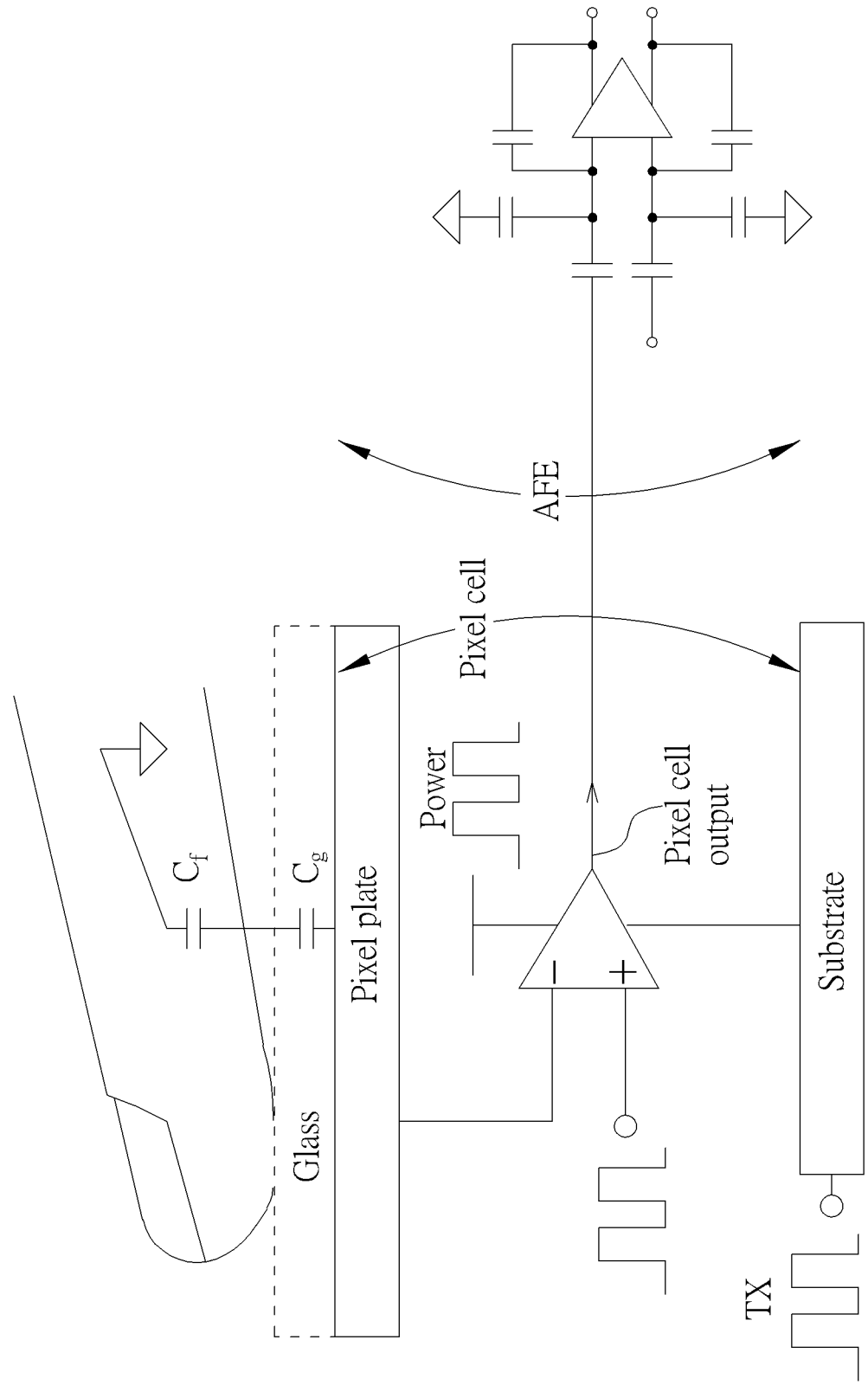
FIG. 1 is a schematic diagram of a fingerprint sensing circuit.

Please refer to FIG. 1, which is a schematic diagram of an exemplary fingerprint sensing circuit. The exemplary fingerprint sensing circuit includes a pixel array and an analog front-end (AFE) circuit, where only one pixel cell in the pixel array is illustrated for simplicity. In the pixel array, each pixel cell includes a sensing electrode (as the pixel plate shown in FIG. 1) and a charge amplifier (or called a pixel amplifier). Multiple pixel cells can be switched time-divisionally to output respective sensing signals to the AFE circuit. A finger touching the fingerprint sensor is considered as being connected to the universal ground. By using the transmitting signal TX (or called excitation signal), the pixel array may obtain information of a finger capacitance $C_f$ and convert the finger capacitance information into the sensing signal (which may be a voltage signal) as the output signal of the charge amplifier. The sensing signal of pixel includes a common-mode (CM) part and a differential-mode (DM) part.

The charge amplifier illustrated in FIG. 1 may have a differential circuit structure, where the inverting input terminal of the charge amplifier receives the signal that carries the information of the finger capacitance $C_f$, and the non-inverting input terminal of the charge amplifier receives a reference voltage. A transmitting signal TX such as a square wave signal is supplied to a substrate where the charge amplifier circuit is disposed, and voltage signals including the power supply voltage, ground voltage and reference voltage have a shifted level based on the transmitting signal TX. In other words, all these voltage signals toggle following the transmitting signal TX (i.e., their voltage levels transit at the same time). The transmitting signal TX may be generated by a charge pump circuit (not shown in FIG. 1) built in the fingerprint sensing circuit, and its p-p amplitude is AVDD or any possible voltage value. The output terminal of the pixel cell (i.e., the output terminal of the charge amplifier) is connected to one of the input terminals of the AFE circuit.

Figure 2:
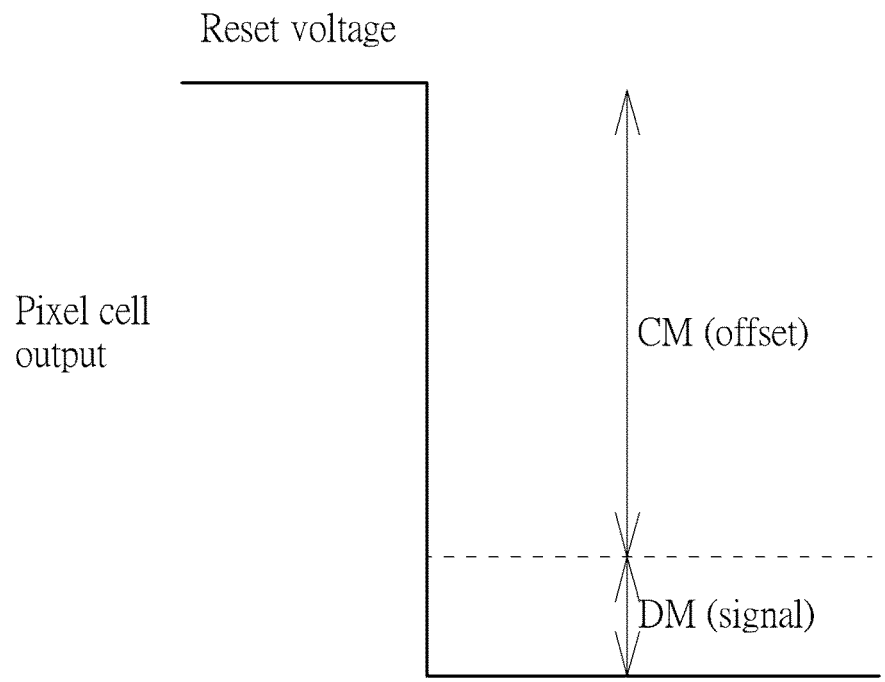
FIG. 2 is a schematic diagram of the output signal of the pixel cell outputted to the AFE circuit.

Please refer to FIG. 2, which is a schematic diagram of the output signal of the pixel cell. The output signal is outputted to the AFE circuit. The fingerprint sensor is protected (or isolated) by a protection layer which may be made of glass or coating, as shown in FIG. 1. Thus, the capacitance information carried out by the pixel cell is with respect to the capacitance of the protection layer, $C_g$, and the finger capacitance $C_f$ in series, so the DM part (with respect to the finger capacitance $C_f$) is quite weaker than the CM part. Further, the toggle of the transmitting signal TX may generate a large voltage variation in the CM part.

In FIG. 1-FIG. 2, when the finger does not touch yet, only the CM part signal appears at the output terminal of the pixel cell. When the finger contacts the fingerprint sensor and the transmitting signal TX is in a high level, the pixel cell outputs a reset voltage which equals VCM (e.g., 1V) plus AVDD (e.g., 3V, which is the amplitude of the transmitting signal TX). When the level of the transmitting signal TX transits from high to low, the output signal of the pixel cell also transits from high to low following the falling edge of the transmitting signal TX, and therefore the output signal of the pixel cell carries out the information of the finger capacitance $C_f$. As shown in FIG. 2, every time when the level of the transmitting signal TX transits from high to low, the output signal as shown in FIG. 2 may be generated in the output terminal of the pixel cell. The downward level of the output signal of the pixel cell may include the magnitude of TX falling (i.e., the CM (offset) shown in FIG. 2, which equals the p-p amplitude AVDD of the transmitting signal TX) and the magnitude of the DM part (i.e., the voltage signal generated from the finger capacitance $C_f$).

Figure 3:
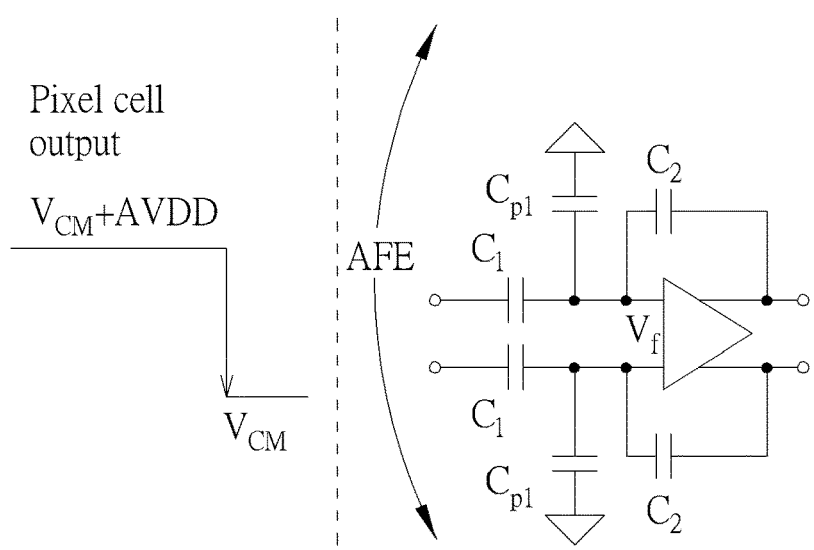
FIG. 3 is a schematic diagram of a circuit stage next to the pixel cell with absence of the CM voltage compensation scheme.

Please refer to FIG. 3, which is a schematic diagram of a circuit stage next to the pixel cell (i.e., the AFE circuit) with absence of the CM voltage compensation scheme. The influences on the AFE circuit in the next stage generated by the CM part of the output signal of the pixel cell are analyzed according to FIG. 3. Without the CM voltage compensation scheme, every time when the level of the transmitting signal TX transits from high to low, the output signal of the pixel cell may possess an excessively large voltage level variation due to the falling CM voltage, which causes a significant downward voltage level variation in the voltage $V_f$ on the floating node of the AFE circuit (i.e., the input terminal of the differential amplifier in the AFE circuit), as described by:

$$V_f = C_{CM} - \frac{C_1}{C_1 + C_{p1} + C_2} \cdot AVDD;$$

wherein $C_1$ is the input capacitance of the differential amplifier, $C_{p1}$ is the parasitic capacitance in the input terminal of the differential amplifier, $C_2$ is the feedback capacitance of the differential amplifier, and AVDD is the peak-to-peak voltage amplitude of the transmitting signal TX. The voltage level variation of $V_f$ (as $-C_1/(C_1+C_{p1}+C_2) \times AVDD$) is determined based on the ratio of the capacitances $C_1$ and $C_2$. Under the situation where the amplifier gain=$C_1/C_2$ which is greater than or equal to 1, the voltage $V_f$ on the input terminal of the differential amplifier may become smaller than zero ($V_f<0V$), and the differential amplifier cannot operate normally under $V_f<0V$. This situation results in signal saturation occurring in the output signal of the AFE circuit.

The embodiments of the present invention provide a CM voltage compensation scheme for the AFE circuit, where the compensation scheme is applicable to the AFE circuit having a single-ended or differential circuit structure. The compensation scheme is capable of maintaining an input terminal of the amplifier at a constant voltage level such as a common-mode voltage level, thereby preventing signal saturation from occurring in the output signal of the AFE circuit.

The embodiments utilize a capacitor group configured to receive a compensation signal and cancel a variation of the common-mode part of the sensing signal. With suitable deigns of the waveforms of the compensation signal and sensing signal, an input terminal of the amplifier can be maintained at a constant common-mode voltage level, preventing signal saturation from occurring in the output signal of the AFE circuit. To achieve this, the compensation signal can be generated according to a variation of the common-mode part of the sensing signal. More specifically, a variation direction of the compensation signal can be arranged opposite to a variation direction of the common-mode part of the sensing signal. In addition, an absolute amount of the variation of the compensation signal can be arranged substantially equal to an absolute amount of the variation of the common-mode part of the sensing signal.

Figure 4:
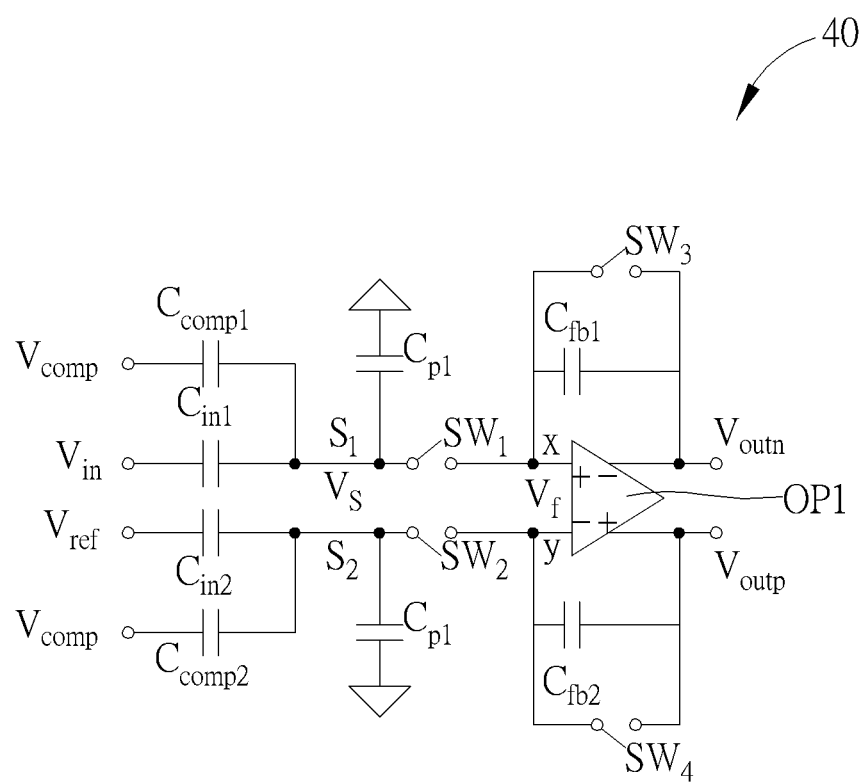
FIG. 4 is a schematic diagram of an AFE circuit with a differential circuit structure according to an embodiment of the present invention.

FIG. 4 illustrates an AFE circuit 40 with a differential circuit structure as an example. As shown in FIG. 4, the AFE circuit 40 includes a capacitor group, an amplifier OP1 and switches $SW_1$-$SW_4$. As for the differential structure, the capacitor group may include two input capacitors $C_{in1}$ and $C_{in2}$, two compensation capacitors $C_{comp1}$ and $C_{comp2}$, and two feedback capacitors $C_{fb1}$ and $C_{fb2}$, and the amplifier OP1 is a differential amplifier. The switches $SW_1$ and $SW_2$ are coupled between the input capacitor $C_{in1}$ and the non-inverting input terminal (+) of the amplifier OP1 and between the other input capacitor $C_{in2}$ and the inverting input terminal (−) of the amplifier OP1, respectively. The switch $SW_3$ is coupled between the non-inverting input terminal (+) and the inverting output terminal (−) of the amplifier OP1. The switch $SW_4$ is coupled between the inverting input terminal (−) and the non-inverting output terminal (+) of the amplifier OP1. The input capacitor $C_{in1}$ and the compensation capacitor $C_{comp1}$ are coupled to a node S1, which is further coupled to the non-inverting input terminal of the amplifier OP1 (i.e., the floating node x) via the switch $SW_1$. The input capacitor $C_{in2}$ and the compensation capacitor $C_{comp2}$ are coupled to a node S2, which is further coupled to the inverting input terminal of the amplifier OP1 (i.e., the floating node y) via the switch $SW_2$. In an embodiment, each of the input capacitors $C_{in1}$ and $C_{in2}$ and the compensation capacitors $C_{comp1}$ and $C_{comp2}$ has a capacitance value $C_1$, and each of the feedback capacitors $C_{fb1}$ and $C_{fb2}$ has a capacitance value $C_2$. $C_p$ refer to parasitic capacitors in the input terminals of the amplifier OP1. $V_{in}$ is an input signal of the AFE circuit 40. The input signal $V_{in}$ may be a sensing signal generated from a fingerprint sensor and outputted by a pixel cell as shown in FIG. 1. $V_{ref}$ is a reference signal such as a pulse signal or square wave signal. $V_{outp}$ and $V_{outn}$ are output signals of the amplifier OP1.

In the input path regarding the input signal $V_{in}$, the input capacitor $C_{in1}$ is configured to couple the input signal $V_{in}$ to the node S1. In the corresponding compensation path, the compensation capacitor $C_{comp1}$ is configured to couple a compensation signal $V_{comp}$ to the node S1. Similarly, in the input path and compensation path regarding the reference signal $V_{ref}$, the input capacitor $C_{in2}$ is configured to couple the reference signal $V_{ref}$ and the compensation capacitor $C_{comp2}$ is configured to couple the compensation signal $V_{comp}$ to the node S2. The amplifier OP1, coupled to the nodes S1 and S2 via the switches $SW_1$ and $SW_2$, respectively, is configured to amplify the input signal $V_{in}$ coupled from the input capacitor $C_{in1}$, and more specifically, configured to amplify the DM part with respect to the finger capacitance $C_f$ in the input signal $V_{in}$ and cancel the CM part in the input signal $V_{in}$.

FIGS. 5A-5E are schematic diagrams of the operations of the AFE circuit 40 in different phases. For easy illustrations, in FIGS. 5A-5E, the input capacitors $C_{in1}$ and $C_{in2}$ and the compensation capacitors $C_{comp1}$ and $C_{comp2}$ are denoted by their capacitance value $C_1$, and the feedback capacitors $C_{fb1}$ and $C_{fb2}$ are denoted by their capacitance value $C_2$. Also, the input signal $V_{in}$, the reference signal $V_{ref}$ and the compensation signal $V_{comp}$ are denoted by their voltage values in each phase. In these phases, the voltage $V_s$ at the nodes S1 and S2 may undergo the cancellation of variation of the CM voltage according to the compensation scheme of the present invention. FIG. 6 is a waveform diagram of the voltage signal in each node and the switch control signals in different phases (ph1-ph5) shown in FIGS. 5A-5E. To eliminate the influence caused by that the input signal $V_{in}$ has a negative DC offset value -AVDD due to the transition of the transmitting signal TX, the compensation capacitors $C_{comp1}$ and $C_{comp2}$ may be used in the AFE circuit 40 and a terminal of each of the compensation capacitors $C_{comp1}$ and $C_{comp2}$ is supplied with a positive DC offset value +AVDD, so that the upward voltage level variation and downward voltage level variation in the node S1 or S2 offset each other. In other words, with the operations of the capacitors in the capacitor group, the variation of the CM part of the input signal $V_{in}$ due to the DC offset is canceled. Therefore, the floating nodes x and y coupled to the input terminals of the amplifier OP1 are maintained at a constant CM voltage level. With the compensation mechanism, the DM part of the output signal of the pixel cell (i.e., the input signal $V_{in}$) with respect to the finger capacitance $C_f$ together with a stable common mode voltage level can be received by an input terminal of the differential amplifier OP1 in the AFE circuit 40. The differential amplifier OP1 may accurately process the compensated signal having a stable common-mode voltage level, and an output terminal of the differential amplifier can provide an amplified signal accurately reflecting the DM part of the output signal of the pixel cell.

Figure 5A:
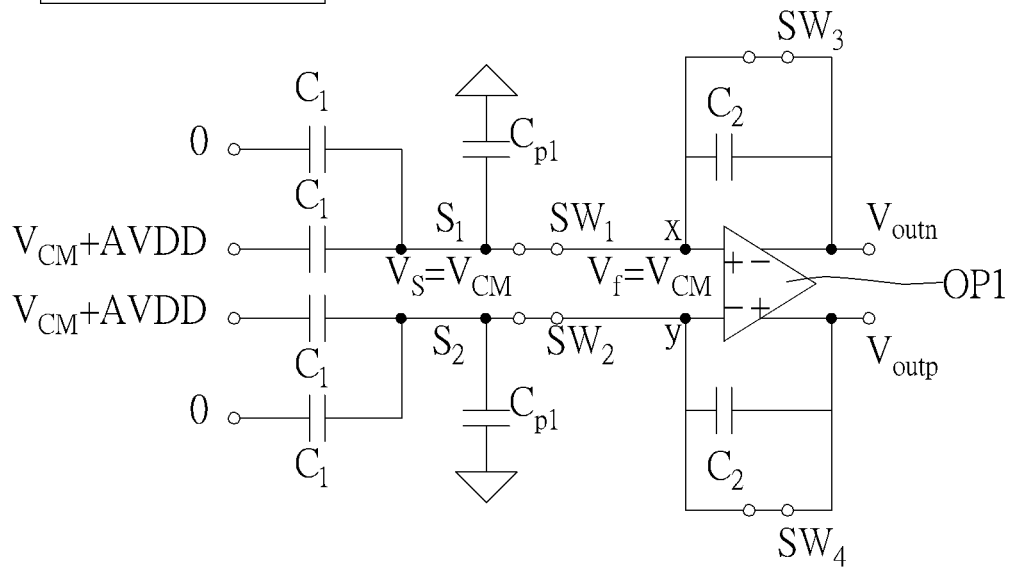
FIGS. 5A-5E are schematic diagrams of the operations of the AFE circuit in different phases.
Figure 6:
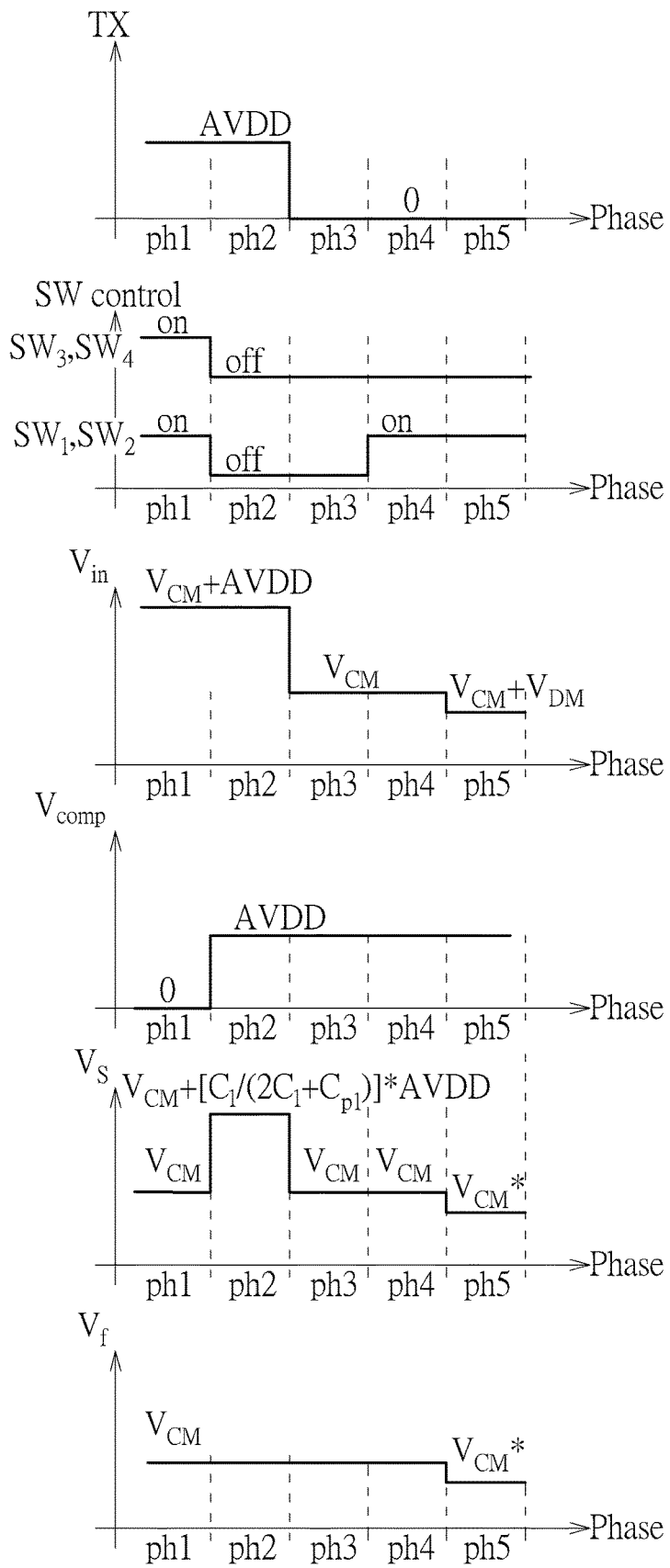
FIG. 6 is a waveform diagram of the voltage signal in each node and the switch control signals in different phases shown in FIGS. 5A-5E.

Please refer to FIGS. 5A and 6, where phase 1 is a reset phase, during which the switches $SW_1$-$SW_4$ are turned on. In this phase, the transmitting signal TX is at high level, and the pixel cell performs reset. In the charge amplifier circuit of the fingerprint sensing circuit, a reset switch (omitted in FIG. 1) is connected between the non-inverting input terminal and the output terminal of the charge amplifier. When the pixel cell is reset, this reset switch is closed (ON). At this moment, the voltage level of the compensation signal $V_{comp}$ is 0V, and the voltage levels of the input signal $V_{in}$ and the reference signal $V_{ref}$ are both $V_{CM}$+AVDD.

Figure 5B:
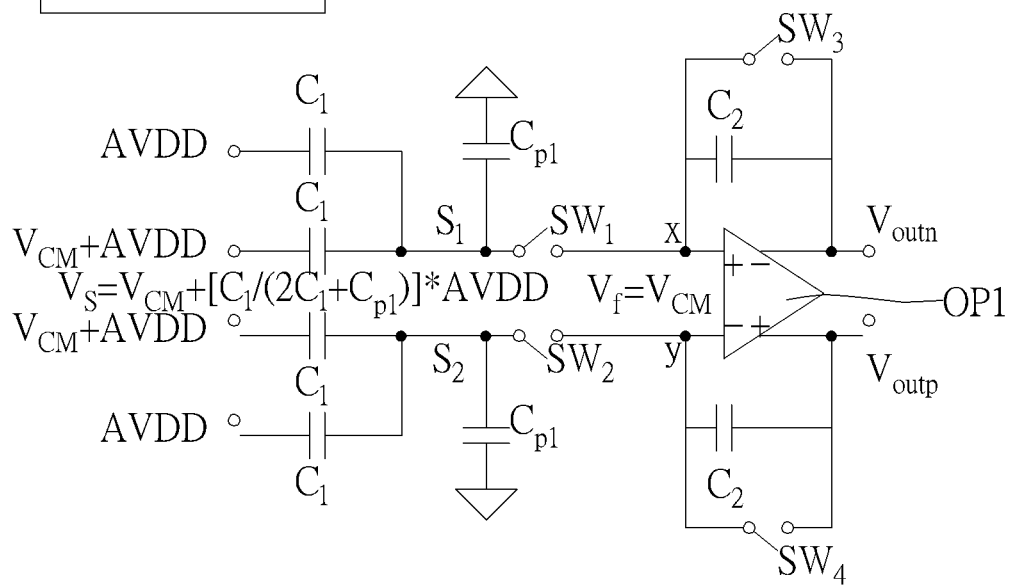

Please refer to FIGS. 5B and 6, where phase 2 is a compensation phase, during which the switches $SW_1$-$SW_4$ are turned off. More specifically, the switches $SW_1$ and $SW_2$ are turned off to isolate the input terminals of the amplifier OP1 from the input terminals of the AFE circuit 40 (i.e., to isolate the floating nodes x and y from the nodes S1 and S2, respectively), to prevent the voltage level variation coupled by the input capacitors $C_{in1}$ and $C_{in2}$ in the input signal paths and the compensation capacitors $C_{comp1}$ and $C_{comp2}$ in the compensation paths from influencing the voltage levels of the input terminals of the amplifier OP1. In this phase, a voltage level variation coupled from the compensation path via the compensation capacitors $C_{comp1}$ and $C_{comp2}$ is coupled to the nodes S1 and S2. Therefore, the voltage levels of the input signal $V_{in}$ and the reference signal $V_{ref}$ are both $V_{CM}$+AVDD, and the voltage level of the compensation signal $V_{comp}$ rises from 0V to AVDD. Since the transmitting signal TX is expected to have a falling voltage level -AVDD, the compensation signal $V_{comp}$ is generated accordingly to have a rising voltage level +AVDD, where the variation direction of the compensation signal $V_{comp}$ is opposite to the variation direction of the CM part of the input signal $V_{in}$ generated from the transmitting signal TX, and the absolute amount of the variation of the compensation signal $V_{comp}$ is equal to the absolute amount of the variation of the CM part of the input signal $V_{in}$.

Figure 7:
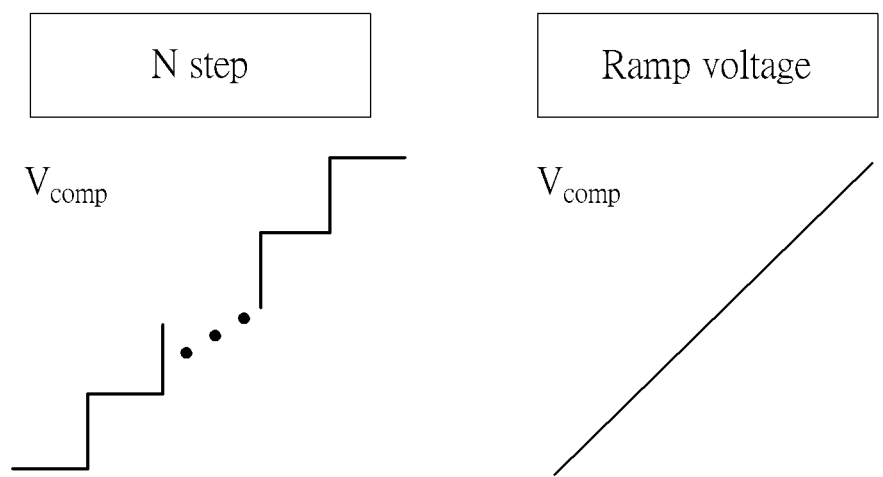
FIG. 7 is a schematic diagram of N-step voltage pumping and voltage pumping with a constant slope.
Figure 8A:
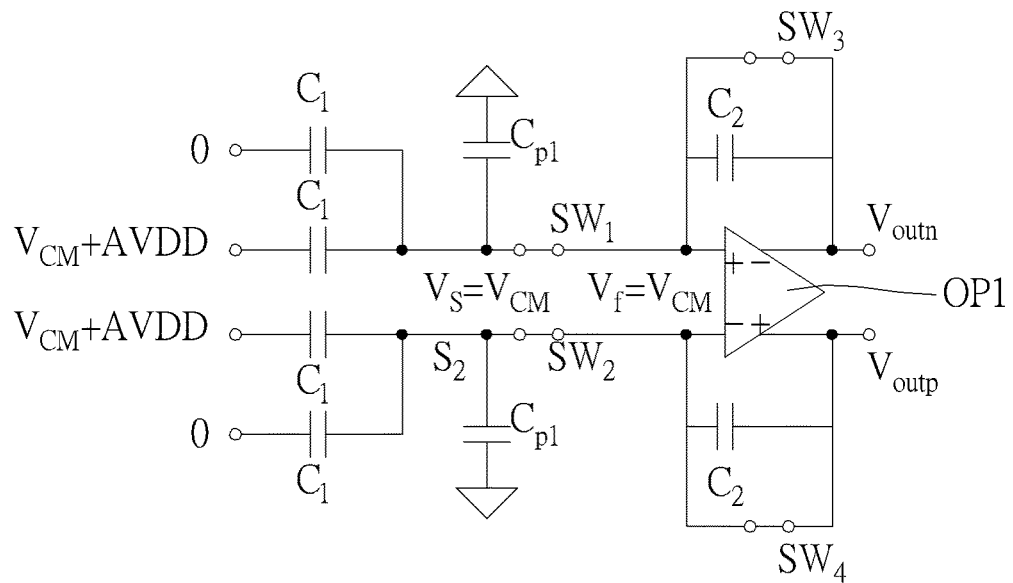
FIGS. 8A-8D are schematic diagrams of the operations of the AFE circuit in different phases with two-step CM voltage compensation.
Figure 8B:
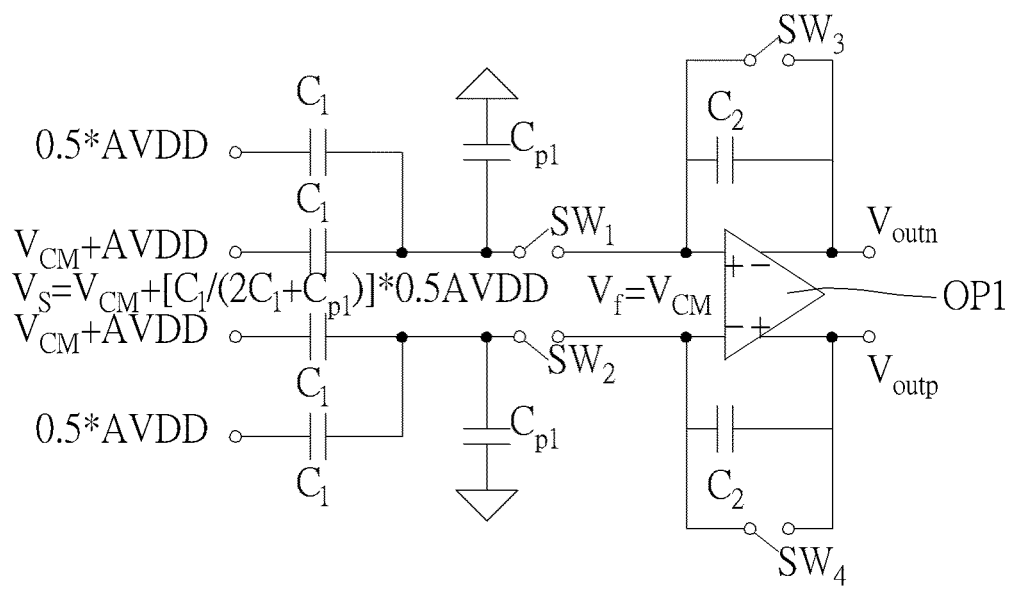
Figure 8C:
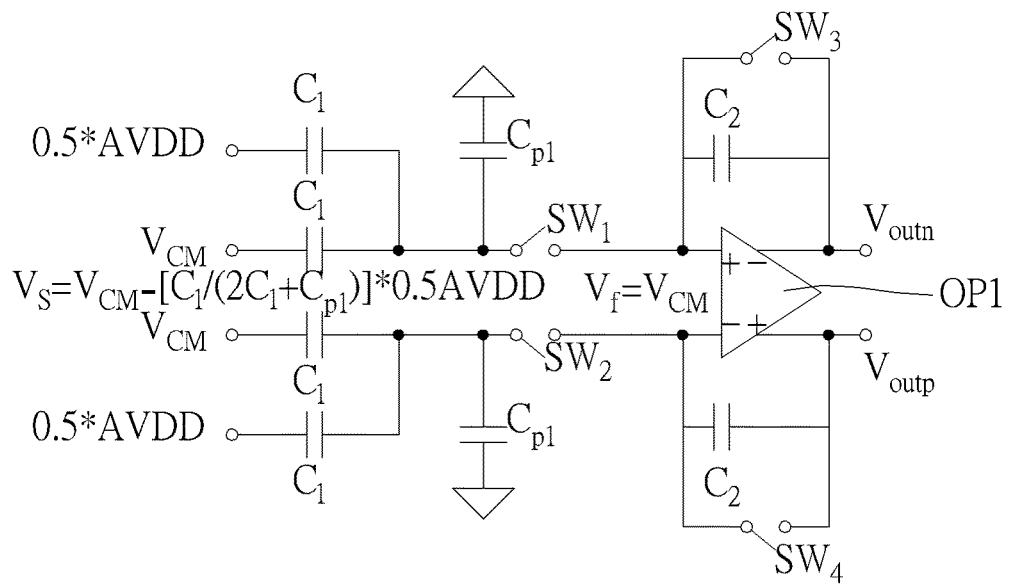
Figure 8D:
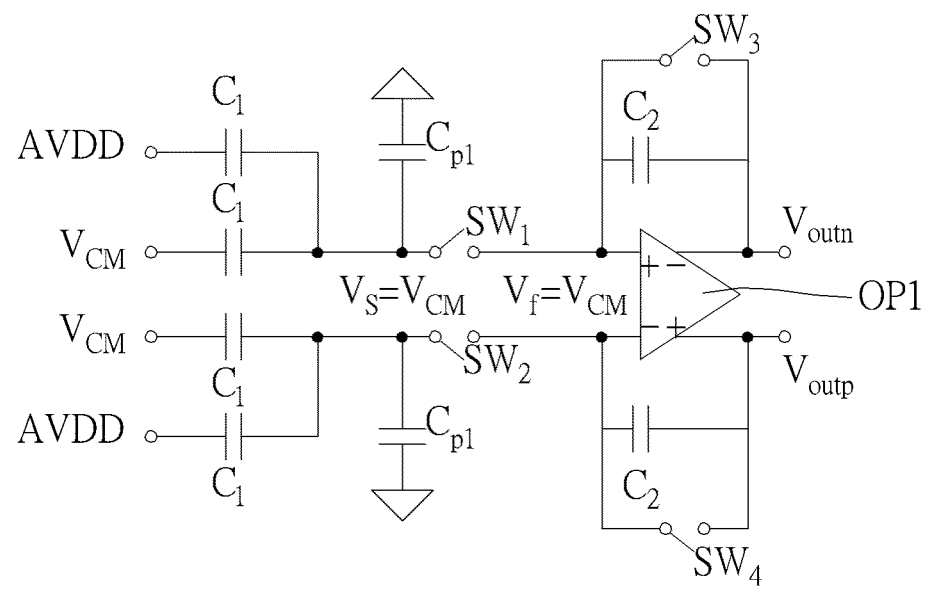

As mentioned above, the compensation signal can be generated according to a variation of the common-mode part of the sensing signal, thereby maintaining an input terminal of the amplifier at a constant common-mode voltage level. More specifically, a variation direction of the compensation signal can be arranged opposite to a variation direction of the common-mode part of the sensing signal. In addition, an absolute amount of the variation of the compensation signal can be arranged substantially equal to an absolute amount of the variation of the common-mode part of the sensing signal. Examples are shown in FIGS. 5A-5E and FIG. 6, in which the compensation signal $V_{comp}$ has a one-step voltage pumping, i.e., the voltage level of the compensation signal $V_{comp}$ is pumped from 0V to AVDD at a time. The method may also be altered to realize with N-step voltage pumping or rising voltage with a constant slope, so as to achieve multi-step voltage pumping, as shown in FIG. 7. If the N-step voltage pumping is applied, the compensation signal $V_{comp}$ may be an N-step rising signal comprising N steps, where N is a positive integer greater than or equal to 1. The summation of the N steps of the N-step rising signal may equal the variation amount of the falling voltage level of the CM part of the input signal $V_{in}$, i.e., AVDD. If the rising voltage with a constant slope is applied, the compensation signal $V_{comp}$ may be a ramp voltage. The rising voltage level of the ramp voltage may equal the variation amount of the falling voltage level of the CM part of the input signal $V_{in}$, i.e., AVDD.

Figure 5C:
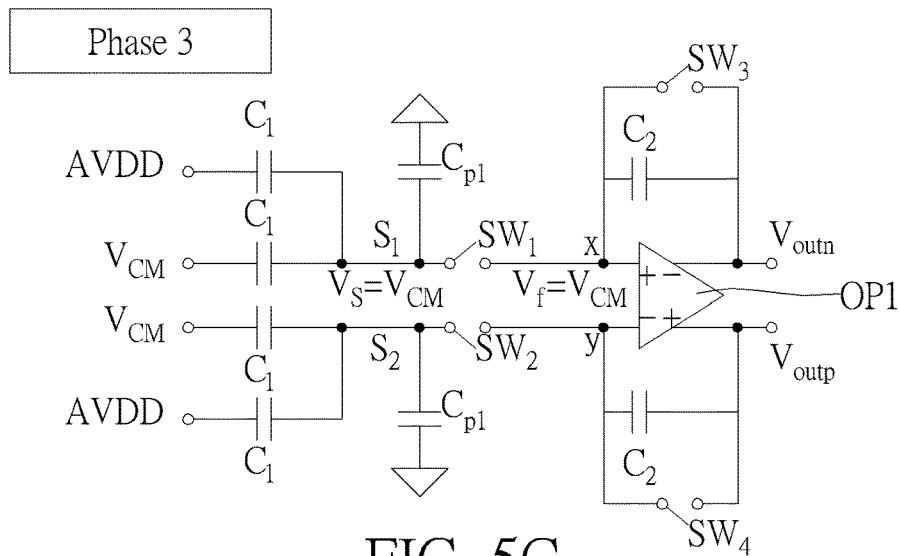

Please refer to FIGS. 5C and 6, where phase 3 is an operation of TX coupling based on the amplitude of the transmitting signal TX, AVDD. In this phase, the voltage level of the transmitting signal TX changes from AVDD to 0V, and the voltage level of the input signal $V_{in}$ changes from $V_{CM}$+AVDD (in phase 2) to $V_{CM}$. In this phase, the floating nodes x and y at the input terminals of the amplifier OP1 are still isolated, i.e., $SW_1$ and $SW_2$ are turned off. The voltage level variation that the transmitting signal TX changes from AVDD to 0V allows the CM part (which is useless and required to be canceled in the present invention) and the DM part (which is a useful signal) to appear at the output terminal of the pixel cell, as shown in FIG. 2. It is noted that when to generate the DM part at the output terminal of the pixel cell may be determined based on the time point when the reset switches in the charge amplifier circuit are turned off. In the embodiment shown in FIG. 5C, the DM part does not appear yet in phase 3. In this phase, the voltage level of the compensation signal $V_{comp}$ is AVDD, and the voltage levels of the input signal $V_{in}$ and the reference signal $V_{ref}$ are both $V_{CM}$.

Please refer to FIGS. 5A-5C, and observe the total charges at the node S1 in different phases. The voltages $V_s$ of the node S1 in phases 1-3 are denoted by $V_{sph1}$, $V_{sph2}$, and $V_{sph3}$, respectively, which will be derived in the following manner. Supposing that the voltage levels of the floating node x and the node S1 are equal to $V_{CM}$ in phase 1, the total charges $q_{ph1}$, $q_{ph2}$ and $q_{ph3}$ in the input capacitor $C_{in1}$, the compensation capacitor $C_{comp}$, and the parasitic capacitor $C_{p1}$ coupled to the node S1 in different phases 1-3 are obtained as follows:

$$q_{ph1}=C_1\cdot[V_{CM}-(V_{CM}+\text{AVDD})]+C_1\cdot V_{CM}+C_{p1}\cdot V_{CM};$$

$$q_{ph2}=C_1\cdot[V_{sph2}-(V_{CM}+\text{AVDD})]+C_1\cdot(V_{sph2}-\text{AVDD})+C_{p1}\cdot V_{sph2};$$

$$q_{ph3}=C_1\cdot[V_{sph3}-\text{AVDD}]+C_1\cdot(V_{sph3}-V_{CM})+C_{p1}\cdot V_{sph3};$$

Due to charge conservation, i.e., $q_{ph1}=q_{ph2}$, the voltage $V_{sph2}$ of the node S1 in phase 2 may be obtained as:

$$V_{sph2} = C_{CM} - \frac{C_1}{2C_1+C_{p1}} \cdot \text{AVDD}.$$

Due to charge conservation, i.e., $q_{ph2}=q_{ph3}$, the voltage $V_{sph3}$ of the node S1 in phase 3 may be obtained as:

$$V_{sph3}=V_{CM}.$$

Observe the voltage $V_s$ of the node S1. The voltage level variation $+\Delta V_s$ (which equals to $\text{AVDD}\times C_1/(2C_1+C_{p1})$) at the node S1 caused by the CM voltage compensation from phase 1 (wherein $V_{sph1}=V_{CM}$) to phase 2 and the voltage level variation $-\Delta V_s$ (which equals to $-\text{AVDD}\times C_1/(2C_1+C_{p1})$) at the node S1 caused by TX coupling from phase 2 to phase 3 offset each other; hence the voltage level $V_{sph3}=V_{CM}$ is obtained in phase 3. Note that the above charge quantity analysis is also applicable to the node S2 since the DM part of the input signal $V_{in}$ has not been received yet in phases 1-3, and thus the reference signal $V_{ref}$ equals the input signal $V_{in}$. During phases 1-3 where the voltage level variations $+\Delta V_s$ and $-\Delta V_s$ appear at the nodes S1 and S2, the switches $SW_1$ and $SW_2$ are turned off, which prevents the input terminals of the amplifier OP1 from being influenced by the voltage coupling on the nodes S1 and S2.

In phase 4 (see FIG. 5D), the switches $SW_1$ and $SW_2$ are turned on, and both of the voltage $V_s$ at the node S1 and the voltage $V_f$ at the floating node x equal $V_{CM}$. In phase 5 (see FIG. 5E), the switches $SW_1$ and $SW_2$ are still turned on. The reset switches in the charge amplifier circuit of the pixel cell are turned off, and thus the DM part appears at the output terminal of the pixel cell (i.e., be outputted to the AFE circuit 40 as the DM part of the input signal $V_{in}$). The DM part signal has a shifted voltage level based on the CM part signal, so that the voltage level with respect to the voltage $V_s$ and the voltage $V_f$ becomes $V_{CM}^*$ (different from $V_{CM}$, see FIG. 6). Phase 5 may be considered as a sensing phase where the sensing signal of the pixel cell is received by the AFE circuit 40. Observe phase 4 and phase 5 where the input terminals of the amplifier OP1 are virtually short-circuited such that the voltage levels on the input terminals of the amplifier OP1 are equal, i.e., the voltages of the floating nodes x and y are equal, $V_x=V_y$, and the total charges on the nodes x and y are obtained in the following manner.

In detail, in phase 4, total charges on the node x is:

$$q_{ph4,x}=C_1\cdot(V_{CM}-\text{AVDD})+C_{p1}\cdot V_{CM};$$

and total charges on the node y is:

$$q_{ph4,y}=C_1\cdot(V_{CM}-\text{AVDD})+C_{p1}\cdot V_{CM}.$$

In phase 5, total charges on the node x is:

$$q_{ph5,x}=C_1\cdot(V_x-\text{AVDD})+C_1\cdot[V_x-(V_{CM}+V_{DM})]+C_{p1}\cdot V_x+C_2\cdot(V_x-V_{outn});$$

and total charges on the node y is:

$$q_{ph5,y}=C_1\cdot(V_x-\text{AVDD})+C_1\cdot[V_x-V_{CM}]+C_{p1}\cdot V_x+C_2\cdot(V_x-V_{outp}).$$

From phase 4 to phase 5, due to charge conservation, a first equation is obtained from $q_{ph4,x}=q_{ph5,x}$ with respect to the floating node x, and a second equation is obtained from $q_{ph4,y}=q_{ph5,y}$ with respect to the floating node y. By one of the first and second equations subtracting the other equation, the differential output signal of the amplifier OP1 from phase 4 to phase 5 may be obtained as:

$$(V_{outp}-V_{outn}) = \frac{C_1}{C_2} \cdot V_{DM}.$$

As can be seen, the differential output signal of the amplifier OP1 does not include the CM part signal, and only includes the DM part signal of the input signal $V_{in}$ which is irrelevant to the CM part of the input signal $V_{in}$. The derivation is based on charge conservation on the floating nodes x and y. The amplifier OP1 should be operated normally in any phase; otherwise, the conservation of total charge on the floating nodes x and y is not tenable.

Please note that the embodiments of the present invention aim at providing a method of processing a sensing signal from a fingerprint sensor which is applicable to a signal processing circuit such as the AFE circuit, to eliminate the variation of the CM part of the sensing signal. Those skilled in the art may make modifications and alternations accordingly. For example, in the embodiment shown in FIGS. 4-6, the DM part signal appears at the input signal $V_{in}$ (i.e., from the output terminal of the pixel cell) in phase 5. In another embodiment of the present invention, the DM part signal may appear earlier in phase 3 or phase 4 without influencing the voltage offset effects on the nodes S1 and S2. In addition, the embodiments of the present invention are applicable to a fingerprint sensor, where the input signal of the AFE circuit may be a fingerprint signal received from the fingerprint sensor of a touch panel. Note that this should not be a limitation of the present invention, and the signal processing circuit and method of the present invention are also applicable to other types of signals.

In the embodiments shown in FIGS. 4 and 5A-5E, $V_{CM}$ in the input signal $V_{in}$ is a part of the common-mode voltage of the charge amplifier, while the $V_{CM}$ described in the node voltage $V_f=V_{CM}$ is the common mode voltage in the input signal of the differential amplifier OP1. These two common mode voltages may be designed to have the same voltage level or different voltage levels, as long as the input common mode voltage of the amplifier OP1 should be selected to have a proper level allowing the amplifier OP1 to be operated in a normal operating region (e.g., to prevent the voltage $V_f$ on the input terminals of the amplifier OP1 from falling below 0V). In other words, the voltage level at the floating node in phase 1 may be identical to or different from the component $V_{CM}$ in the input signal $V_{in}$ received from the charge amplifier of the pixel cell.

As mentioned above, the AFE circuit may have a single-ended or differential circuit structure, and the differential circuit structure is taken as an example in the above embodiment shown in FIG. 4. Those skilled in the art may understand that a single-ended circuit structure of the AFE circuit may be realized by replacing the differential amplifier OP1 by a single-ended amplifier (e.g., having one input terminal and/or one output terminal) and removing the lower half part of the capacitors and switches in the AFE circuit 40. The detailed implementations and operations of the single-ended amplifier are easily understood by those skilled in the art and will not be narrated herein.

In addition, take the embodiment in FIGS. 4 and 5A-5E as an example. In the compensation process from phase 1 to phase 3, if the time constant is different between the input signal path and the compensation path (which is determined based on the load situations in the front end of each path), a burst pulse with an excessively high amplitude may be generated at the node S1 and/or S2 during the voltage offset process. If the burst pulse exceeds AVDD, the switch $SW_1$ and/or $SW_2$ may not be normally turned off, which generates a body leakage current. To prevent this problem, the N-step rising signal or the ramp voltage as shown in FIG. 7 is preferably applied to realize the CM voltage compensation scheme.

The present invention provides an embodiment applying two-step CM voltage compensation, as shown in FIGS. 8A-8D. Phase 1 to phase 4 illustrated in the embodiment of FIGS. 8A-8D may be regarded as the operations of one-step compensation voltage pumping from phase 1 to phase 2 in the embodiment of FIGS. 5A-5B being divided into two-step compensation voltage pumping. Hence, there are two compensation phases (i.e., phase 2 and phase 4) sandwiching a phase receiving the falling variation in the CM part signal due to TX coupling (i.e., phase 3). In an embodiment, the voltage $V_s$ of the node S1 is pumped by approximately AVDD/4 at a time (in comparison, $V_s$ in the embodiment of FIG. 4 is pumped by AVDD/2 at a time), and the operation of TX coupling is inserted between the two phases of compensation voltage pumping. From phase 1 to phase 4 of FIGS. 8A-8D, the input signal $V_{in}$ has a −AVDD variation and the compensation signal $V_{comp}$ has a totally +AVDD variation divided into two rising steps, so that the voltage $V_s$ at the node S1 finally returns to the desired CM voltage, i.e., $V_s=V_{CM}$. After phase 4 of FIG. 8D, the operations of generating the DM part signal are identical to the operations in phases 4-5 shown in FIGS. 5D-5E, and are omitted herein.

Figure 9:
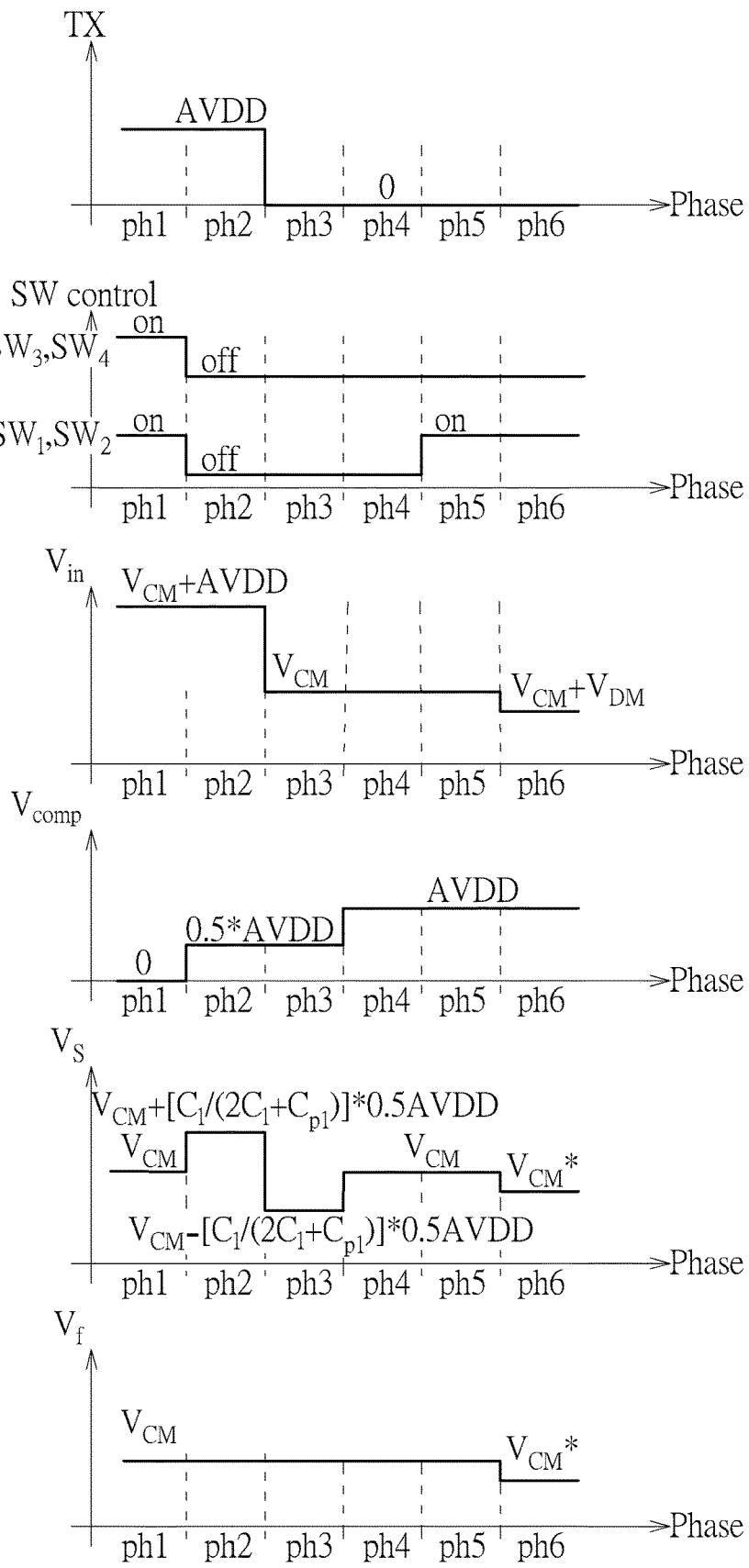
FIG. 9 is a schematic diagram of the voltage signal in each node and the switch control signals in different phases with the two-step CM voltage compensation scheme shown in FIGS. 8A-8D.

Please refer to FIG. 9, which is a schematic diagram of the voltage signal in each node and the switch control signals in different phases with the two-step CM voltage compensation scheme shown in FIGS. 8A-8D. Phases 5-6 shown in FIG. 9 are identical to phases 4-5 shown in FIG. 6.

Observe the total charges on the node S1 in different phases, where the voltages $V_s$ of the node S1 in phases 1-4 shown in FIGS. 8A-8D are denoted by $V_{sph1}$, $V_{sph2}$, $V_{sph3}$ and $V_{sph4}$, respectively, which will be derived in the following manner. Supposing that the voltage levels of the floating node x and the node S1 are equal to $V_{CM}$ in phase 1, the total charges $q_{ph1}$, $q_{ph2}$, $q_{ph3}$ and $q_{ph4}$ in the input capacitor $C_{in1}$, the compensation capacitor $C_{comp1}$, and the parasitic capacitor $C_{p1}$ coupled to the node S1 in different phases 1-4 are obtained as follows:

$q_{ph1}=C_1 \cdot [V_{CM}-(V_{CM}|\text{AVDD})]|C_1 \cdot V_{CM}|C_{p1} \cdot V_{CM};$ $q_{ph2}=C_1 \cdot [V_{sph2}-(V_{CM}+\text{AVDD})]+ C_1 \cdot (V_{sph2}-\text{AVDD}/2)+C_{p1} \cdot V_{sph2};$ $q_{ph3}=C_1 \cdot [V_{sph3}-V_{CM}]+ C_1 \cdot (V_{sph3}-\text{AVDD}/2)+C_{p1} \cdot V_{sph3};$ $q_{ph4}=C_1 \cdot [V_{sph4}-V_{CM}]+C_1 \cdot (V_{sph4}-\text{AVDD})+C_{p1} \cdot V_{sph4};$ Due to charge conservation, i.e., $q_{ph1}=q_{ph2}$, the voltage $V_{sph2}$ of the node S1 in phase 2 may be obtained as:

$$V_{sph2} = V_{CM} - \frac{C_1}{2C_1 + C_{p1}} \cdot \frac{\text{AVDD}}{2}.$$

Due to charge conservation, i.e., $q_{ph2}=q_{ph3}$, the voltage $V_{sph3}$ of the node S1 in phase 3 may be obtained as:

$$V_{sph3} = V_{CM} - \frac{C_1}{2C_1 + C_{p1}} \cdot \frac{\text{AVDD}}{2}.$$

Due to charge conservation, i.e., $q_{ph3}=q_{ph4}$, the voltage $V_{sph4}$ of the node S1 in phase 4 may be obtained as:

$V_{sph4}=V_{CM}.$

Figure 5D:
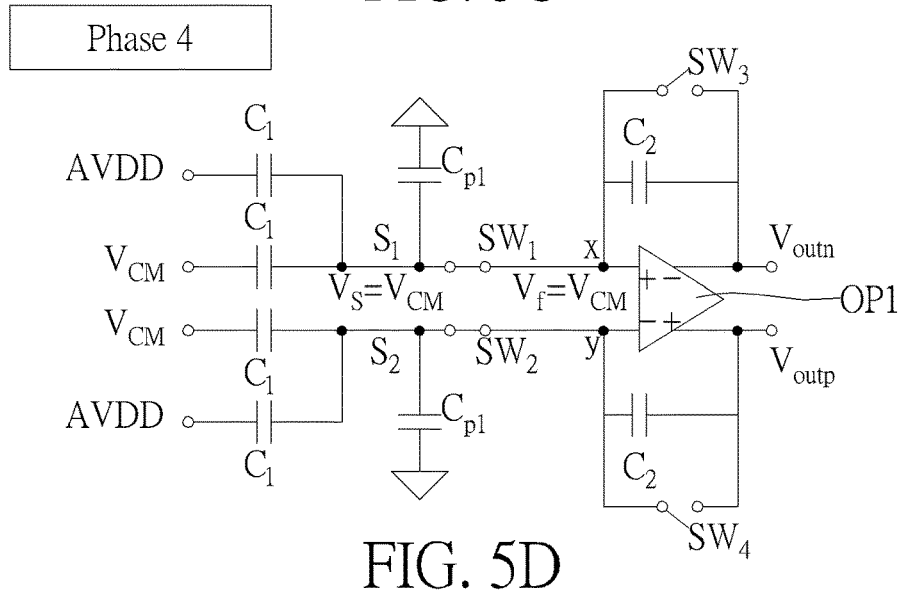
Figure 5E:
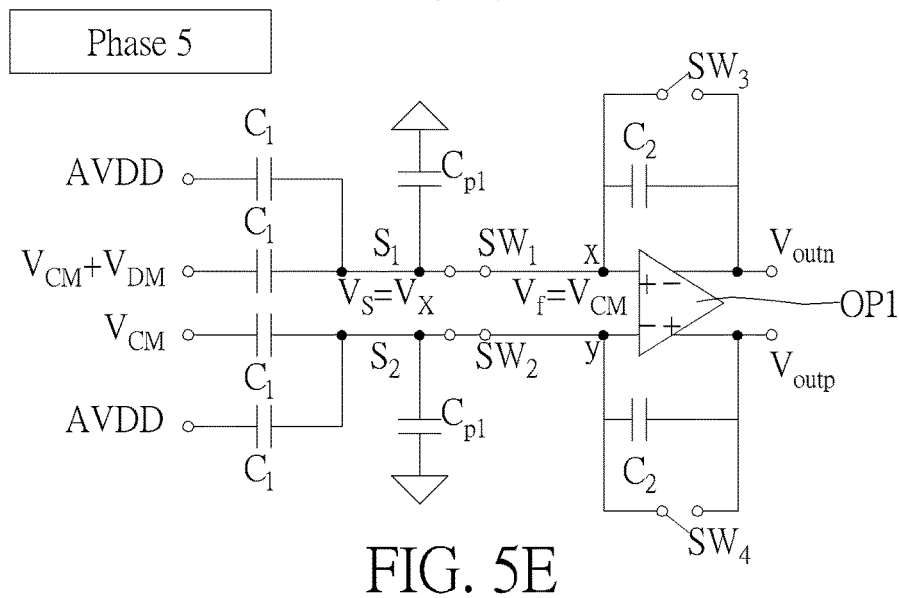

The detailed operations and related derivations of the output signal of the amplifier OP1 are similar to phases 4-5 shown in FIGS. 5D-5E and related paragraphs, and will be omitted herein. With the implementations of the two-step voltage compensation, the problem of body leakage current may be reduced or prevented.

Figure 10:
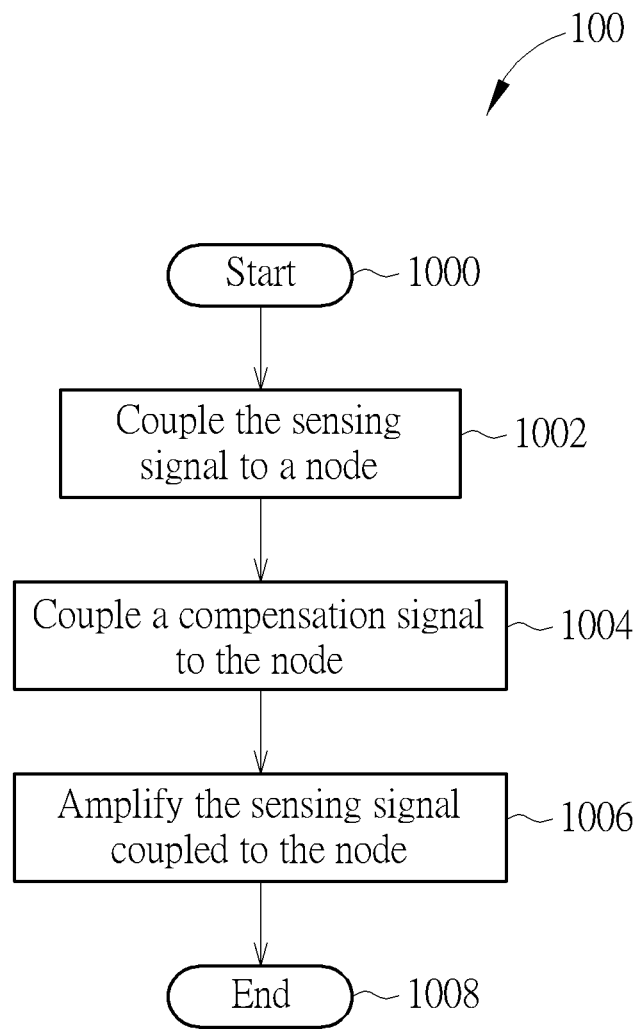
FIG. 10 is a flow chart of a process according to an embodiment of the present invention.

The abovementioned method of processing the sensing signal may be summarized into a process 100, as shown in FIG. 10. The process 100 may be implemented in a signal processing circuit such as the AFE circuit 40 shown in FIG. 4, for processing an input signal such as a sensing signal from a fingerprint sensor. The process 100 includes the following steps:

Step 1000: Start.
Step 1002: Couple the sensing signal to a node.
Step 1004: Couple a compensation signal to the node.
Step 1006: Amplify the sensing signal coupled to the node.
Step 1008: End.

The detailed operations and alternations of the process 100 are illustrated in the above paragraphs and will not be narrated herein.

To sum up, the embodiments of the present invention provide a method of processing a sensing signal from a fingerprint sensor which is applicable to a signal processing circuit such as the AFE circuit, to eliminate the variation of the CM part of the sensing signal. To cancel the voltage level variation of the CM part generated from coupling of the transmitting signal (TX), a compensation signal having an equal variation amount and a variation direction opposite to the TX coupling is coupled to a node on the signal path. In another embodiment, the compensation signal may be an N-step rising signal or a ramp signal to realize the voltage compensation. With the CM voltage compensation scheme, the voltages on the input terminals of the amplifier in the AFE circuit are prevented from greatly varying such as falling below 0V, which ensures the amplifier to operate normally.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the disclosure (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An analog front-end (AFE) circuit, for receiving a sensing signal from a sensor, the sensing signal consisting of a common-mode part and a differential-mode part, the AFE circuit comprising:
   a capacitor group, coupled to a node, comprising:
      an input capacitor, for coupling the sensing signal to the node; and
      a compensation capacitor, for coupling a compensation signal from a compensation input terminal to the node, the compensation capacitor comprising:
         a first terminal, coupled to the compensation input terminal; and
         a second terminal, coupled to the node;
   an amplifier, coupled to the node, for amplifying the sensing signal coupled from the input capacitor; and
   a switch, coupled between the node and the amplifier.

2. The AFE circuit of claim 1, wherein the capacitor group is configured to cancel a variation of the common-mode part of the sensing signal.

3. The AFE circuit of claim 1, wherein the capacitor group is configured to maintain an input terminal of the amplifier at a constant common-mode voltage level.

4. The AFE circuit of claim 1, wherein the compensation signal is generated according to a variation of the common-mode part of the sensing signal.

5. The AFE circuit of claim 4, wherein a variation direction of the compensation signal is opposite to a variation direction of the common-mode part of the sensing signal.

6. The AFE circuit of claim 4, wherein an absolute amount of the variation of the compensation signal is equal to an absolute amount of the variation of the common-mode part of the sensing signal.

7. The AFE circuit of claim 1, wherein the compensation signal is an N-step rising signal comprising N steps, and N is a positive integer greater than or equal to 1.

8. The AFE circuit of claim 7, wherein a summation of the N steps of the N-step rising signal equals a variation amount of a falling voltage level of the common-mode part of the sensing signal.

9. The AFE circuit of claim 1, wherein the compensation signal is a ramp voltage.

10. The AFE circuit of claim 9, wherein a rising voltage level of the ramp voltage equals a variation amount of a falling voltage level of the common-mode part of the sensing signal.

11. The AFE circuit of claim 1, wherein there exists at least one compensation phase and a sensing phase following the compensation phase, wherein during the at least one compensation phase the switch is turned off and during the sensing phase the switch is turned on.

12. The AFE circuit of claim 11, wherein there further exists a reset phase during which the switch is turned on.

13. The AFE circuit of claim 1, wherein an output signal of the amplifier is the differential-mode part of the sensing signal irrelevant to the common-mode part of the sensing signal.

14. The AFE circuit of claim 1, wherein the sensing signal is a fingerprint signal received from a fingerprint sensor of a touch panel.

15. The AFE circuit of claim 1, wherein the AFE circuit is a single-ended circuit or a differential circuit.

16. A method of processing a sensing signal received from a sensor, the sensing signal consisting of a common-mode part and a differential-mode part, the method comprising:
   coupling the sensing signal to a node;
   coupling a compensation signal to the node; and
   amplifying the sensing signal coupled to the node;
   wherein the compensation signal is coupled to the node to maintain an input terminal of an amplifier amplifying the sensing signal at a constant common-mode voltage level.

17. The method of claim 16, wherein the compensation signal is coupled to the node to cancel a variation of the common-mode part of the sensing signal.

18. The method of claim 16, wherein the compensation signal is generated according to a variation of the common-mode part of the sensing signal.

19. The method of claim 18, wherein a variation direction of the compensation signal is opposite to a variation direction of the common-mode part of the sensing signal.

20. The method of claim 18, wherein an absolute amount of the variation of the compensation signal is equal to an absolute amount of the variation of the common-mode part of the sensing signal.

21. The method of claim 16, wherein the compensation signal is an N-step rising signal comprising N steps, and N is a positive integer greater than or equal to 1.

22. The method of claim 21, wherein a summation of the N steps of the N-step rising signal equals a variation amount of a falling voltage level of the common-mode part of the sensing signal.

23. The method of claim 16, wherein the compensation signal is a ramp voltage.

24. The method of claim 23, wherein a rising voltage level of the ramp voltage equals a variation amount of a falling voltage level of the common-mode part of the sensing signal.

25. The method of claim 16, wherein the node is coupled to an amplifier for amplifying the sensing signal via a switch, and there exists at least one compensation phase and a sensing phase following the compensation phase, wherein during the at least one compensation phase the switch is turned off and during the sensing phase the switch is turned on.

26. The method of claim 25, wherein there further exists a reset phase during which the switch is turned on.

27. The method of claim 16, wherein an output signal of an amplifier for amplifying the sensing signal is the differential-mode part of the sensing signal irrelevant to the common-mode part of the sensing signal.

28. The method of claim 16, wherein the sensing signal is a fingerprint signal received from a fingerprint sensor of a touch panel.

29. The method of claim 16, wherein the method of processing the sensing signal is implemented in a signal processing circuit, which is a single-ended circuit or a differential circuit.

* * * * *